US008166244B2

(12) United States Patent
Fruchter et al.

(10) Patent No.: US 8,166,244 B2
(45) Date of Patent: Apr. 24, 2012

(54) EMULATING A COMPUTER SYSTEM ON A REMOVABLE STORAGE DEVICE

(75) Inventors: Ari Daniel Fruchter, Ramat Aviv (IL); Judah Gamliel Hahn, Ofra (IL)

(73) Assignee: Sandisk IL Ltd., Kfar Saba (IL)

( * ) Notice: Subject to any disclaimer, the term of this patent is extended or adjusted under 35 U.S.C. 154(b) by 243 days.

(21) Appl. No.: 12/722,986

(22) Filed: Mar. 12, 2010

(65) Prior Publication Data

US 2011/0225365 A1   Sep. 15, 2011

(51) Int. Cl.
*G06F 12/00* (2006.01)
(52) U.S. Cl. .............. 711/115; 711/6; 711/103; 714/28; 718/1
(58) Field of Classification Search .............. 711/6, 103, 711/115; 714/28; 718/1
See application file for complete search history.

(56) References Cited

U.S. PATENT DOCUMENTS

| | | | | |
|---|---|---|---|---|
| 4,727,480 | A * | 2/1988 | Albright et al. | 703/25 |
| 5,727,217 | A * | 3/1998 | Young | 710/260 |
| 5,819,063 | A * | 10/1998 | Dahl et al. | 703/27 |
| 6,496,847 | B1 * | 12/2002 | Bugnion et al. | 718/1 |
| 7,418,344 | B2 | 8/2008 | Holtzman et al. | |
| 7,441,113 | B2 | 10/2008 | Chong et al. | |
| 2002/0016827 | A1 * | 2/2002 | McCabe et al. | 709/213 |
| 2002/0052727 | A1 * | 5/2002 | Bond et al. | 703/26 |
| 2004/0138868 | A1 * | 7/2004 | Kuznetsov et al. | 703/25 |
| 2005/0108297 | A1 | 5/2005 | Rollin et al. | |
| 2006/0206666 | A1 * | 9/2006 | Lambert et al. | 711/115 |
| 2007/0143528 | A1 * | 6/2007 | Przybylek | 711/103 |
| 2007/0168648 | A1 | 7/2007 | Mardiks et al. | |
| 2008/0046990 | A1 | 2/2008 | Narayanaswami et al. | |
| 2008/0162785 | A1 | 7/2008 | LaPedis et al. | |

OTHER PUBLICATIONS

Lockheed Martin, IronClad™—A Secure, Portable "PC on a Stick," www.lockheedmartin.com/products/IronClad, Jan. 19, 2010, 2 pages.
"Lockheed Martin Introduces IronClad—Secure Computing on a USB Flash Drive" press release, http://www.lockheedmartin.com/news/press_releases/2010/01-18-IronClad.html, Jan. 18, 2010, 3 pages.
"Bring the Power of Portable Software to Your USB Flash Drive—Make it a U3 Smart Drive," http://www.u3.com/default.aspx, printed Mar. 11, 2010, 2 pages.
"Yoggie Launches New Breed of Secure USB Flash Drive," press release, Jun. 30, 2009, 2 pages.
Yoggie Data Keeper™, Yoggie Security Systems, http://www.yoggie.com/Data-Keeper, printed Mar. 11, 2010, 1 page.

* cited by examiner

*Primary Examiner* — Jae Yu
(74) *Attorney, Agent, or Firm* — Toler Law Group, PC

(57) ABSTRACT

A removable storage device with a processor and a non-volatile memory, and a method for using a removable storage device, are provided to emulate the computer system. The storage device stores in the non-volatile memory data it obtained from a first computer system, the data containing computer applications. When the storage device is removably connected to a second computer system and the second computer system is associated with a computer peripheral device, the processor in the storage device is instructed to emulate the original process environment of the first computer system.

25 Claims, 4 Drawing Sheets

EMULATING A COMPUTER SYSTEM ON A REMOVABLE STORAGE DEVICE

FIELD OF THE INVENTION

The present invention generally relates to portable removable storage devices and more specifically to a removable storage device (e.g., USB Flash Drive) emulating a computer system, such as a personal computer ("PC").

BACKGROUND

Computer systems, such as laptop computers, desktop computers, notebooks and handsets, even mobile phones, are equipped or can be coupled with computer peripheral devices that allow users to conveniently interact with them. Exemplary peripheral devices include computer display, loudspeakers, keyboard and mouse, among others. In some cases an end-user performing an operation on a computer system may want, or may be compelled, to log off a computer system for an indefinite time period (e.g., hours, days, or months). For example, people may use PCs to play video games. An end-user playing a video game on one PC may want to quit playing the game on the PC and later resume playing that game on another PC from the same point where the game was stopped. Moreover, if an end-user logs off the PC at a certain point (e.g., in the middle of editing a document) and after a while logs in to the same PC in order to continue the operation from the same point, the user has to manually reactivate the application(s) that were active on the PC prior to the log off. The need to manually reactivate application(s) is burdensome and time consuming to end users.

In order to allow an end-user to quit an application executing (e.g., playing the game) on the PC, a process running on one PC, and resume that process on another PC at the same state where the original process was stopped, there is a need to export to the second PC the state of the process as it was on the first PC when it was stopped. Accordingly, there is a need to enable a more smooth and efficient transition of processes between devices such as PCs.

SUMMARY

Embodiments of the present invention are defined by the claims, and nothing in this section should be taken as a limitation on those claims. By way of example, the embodiments described in this document and illustrated in the attached drawings generally relate to emulating a computer system on a removable storage device. A removable storage device with a processor and a non-volatile memory, and a method for using a removable storage device, are provided to emulate the computer system. The storage device stores in the non-volatile memory data it obtained from a first computer system, e.g., by copying the data from the first computer via a secure channel. The data that is obtained from the first computer system contains computer applications. When the storage device is removably connected to a second computer system and the second computer system is associated with a computer peripheral device, the processor in the storage device is instructed to emulate the original process environment. In this example, the processor will be: executing the computer applications within the storage device; receiving an event from the second computer system; interpreting the event by using the data stored in the storage device; and producing a result that corresponds to the received event. The event, which is received by the processor from the second computer system, results from interaction of a user with the computer peripheral device. The user interaction is associated with the computer applications being executed in the storage device. The process of interpreting the event may include processing data stored on the non-volatile memory, according to the received event.

BRIEF DESCRIPTION OF THE DRAWINGS

The accompanying drawings, which are incorporated in and constitute part of this specification, illustrate various embodiments with the intent that these examples not be restrictive. It will be appreciated that for simplicity and clarity of the illustration, elements shown in the figures referenced below are not necessarily drawn to scale. Also, where considered appropriate, reference numerals may be repeated among the figures to indicate like, corresponding or analogous elements. Of the accompanying figures.

DETAILED DESCRIPTION

Figure 1:
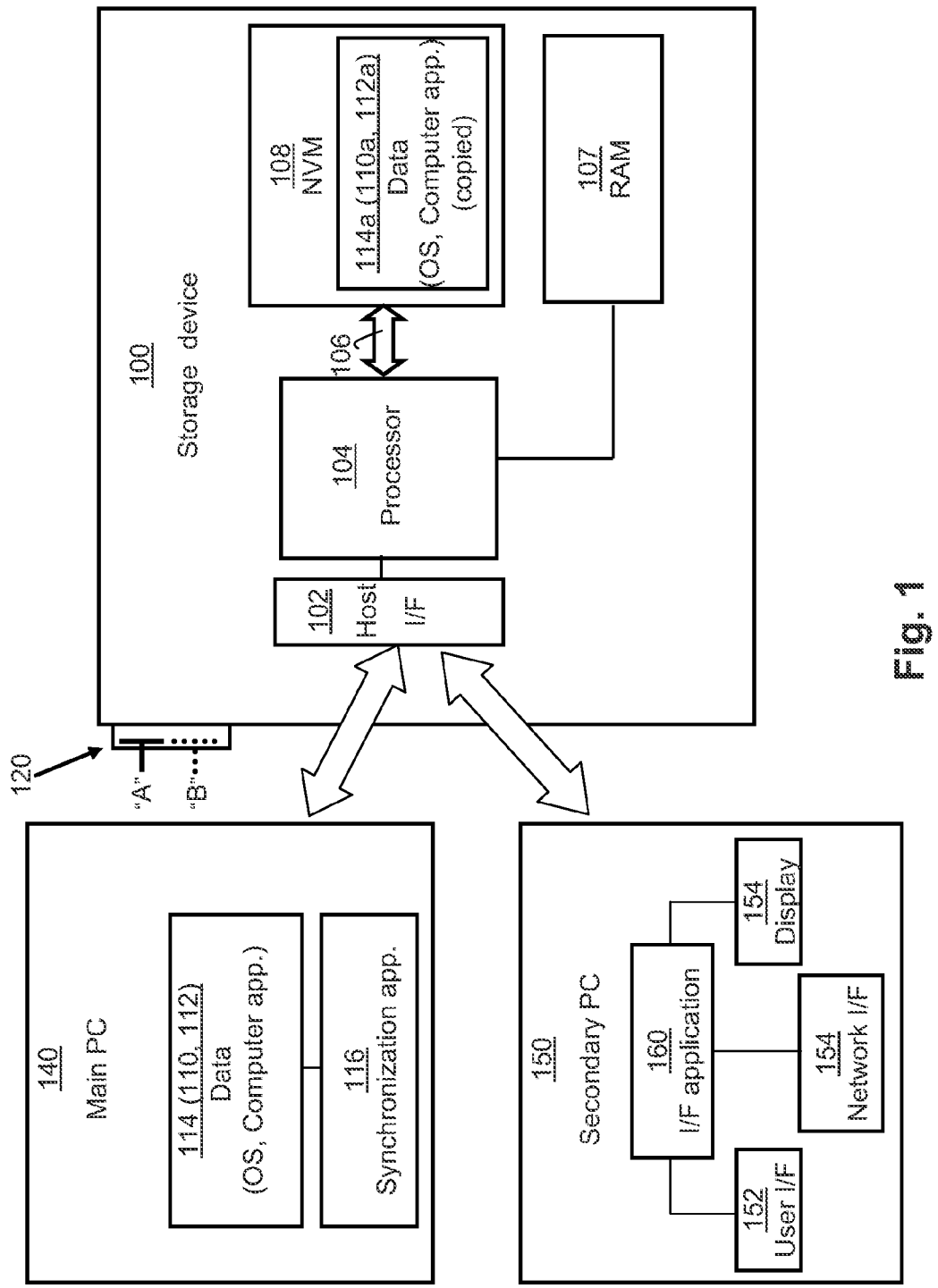
FIG. 1 is a block diagram of a storage device according to one embodiment.

The description that follows provides various details of example embodiments. However, this description is not intended to limit the scope of the claims but instead to explain various principles and details of the invention and the manner of practicing it.

The following discussion, therefore, presents exemplary embodiments that include a portable removable storage device that emulates a computer system, such as a personal computer (PC). In this context, "computer system" may be any processing system having an operating system ("OS") and associated computer applications (software), and further including, or being connectable, to computer peripheral devices. Such computer system may be a personal computer (e.g., a laptop or a desktop computer), a notebook, a mobile phone, a video game machine, etc. User-interface devices (e.g., keyboard and mouse), computer displays, and network interface device are exemplary computer peripheral devices.

For enabling applications mobility, U3 is one example of a platform that facilitates mobility to some extent. In a typical implementation, U3-platform-based applications are implemented on a USB flash drive that lets a user transport user applications and personal preferences and enables particular software to run in order to interact with such applications. U3 form-factor devices (also called U3 smart drives) are flash drive-based USB devices that contain U3 applications. One type of such device is created for an OS such as the Microsoft™ Windows™ OS (Operating System). A U3 application is a software application that runs directly from a U3 device. The U3 platform provides application mobility that can be used by a user to take his/her favorite programs and files and use them on any computer. With such technology, software applications are not tied to a single machine. Rather, the software can run off on any suitably equipped and configured device without installation on a host computer.

However, this U3 mobility requires that suitable programs be pre-installed on the host computer (i.e., the applications on the host computer need to have been developed especially for the U3 platform). Furthermore, the auto-install process that is required during setup for enabling the U3 functionality is time-consuming and in some cases not desired by users at all.

In order to be able to quit a program on one computer system, which is referred to herein as a "main computer system", and to resume using the program from the same point/state on a removable storage device without having to manually save a document, reactivate the application and reopen the document, the most recent working environment (e.g., operating states, computer settings, etc.) of the main computer system, in addition to the relevant programs and applications, have to be copied to the storage device prior to quitting the program on the main computer system. Therefore, according to an embodiment, in addition to the traditional operation of storing user files on a removable storage device, the working environment of the main computer system is also copied to the removable storage device. Copying a working environment of a computer system to a removable storage device could be counter-intuitive because, typically, removable storage devices do not have computer peripheral devices, nor are they designed to interact with such peripheral devices. At the same time, a working environment is typically designed to be used (not merely stored) using computer peripheral devices. To that end, in one instance, the removable storage device is provided with processing means that enable it to take control of (i.e., use) computer peripheral devices of another computer system, which is referred to herein as a "second computer system" (or a "secondary computer system"), by interacting with an interface application running on the second computer system when using computer applications (software) executed on the storage device. The storage device can use the computer peripheral devices of the second computer system to work with the working environment of the main computer system.

A storage device using a working environment of a computer system (e.g., PC) and computer peripheral devices of the same or another computer system can be thought of as the storage device emulating a computer system, or as the storage device being a portable computer system.

Emulating a computer system on a removable storage device requires that the storage device be equipped with, or store a copy of the data, including computer applications, computer settings and, optionally, operating system (OS), that are currently active on the emulated computer system and that pertain to the current state of the emulated computer system and to the active computer applications. The emulation by the storage device enables users to interact with data stored, and computer applications executed, thereon it by using computer peripheral devices of another computer system, or of the emulated computer system.

It will be appreciated that a PC is used herein as an example of computer system for simplicity and clarity of the description and accompanying drawings; and thus any other computer system may be used interchangeably. Accordingly, a main PC and a second PC are provided as a mere example to indicate a first and a second computer system.

By "emulating a PC" (or by emulating a computer system other than a PC) is generally meant herein initializing a removable storage device with data currently active, or residing on the emulated PC (computer system), and enabling users to interact with the data stored in the storage device by using computer peripheral devices of another PC (or computer system), or of the emulated PC (computer system). By "initializing" a storage device is meant copying data, including stored content, OS (optionally) and computer applications, onto the storage device, in preparation for the device to emulate the PC (computer system) from which the data were copied. The data copied in this regard may also be referred to as the "emulation particulars".

FIG. 1 shows a removable storage device 100 that emulates a computer system, according to an embodiment. Storage device 100 includes a non-volatile memory ("NVM") 108 storing data that is obtained from a first computer system (e.g. a min PC 140), and a processor 104. When storage device 100 is removably connected to a computer system, processor 104 can exchange data and commands with the connected computer system by using a host interface 102.

Processor 104 is configured to, when storage device 100 is removably connected to a second computer system (e.g. secondary PC 150), execute computer applications within storage device 100; receive an event from the second computer system; interpret the event by using the data stored on the storage device; and produce a result corresponding to the received event. The user interaction is associated with the (copied) computer applications that are being executed within the storage device. The event results from interaction of a user with a computer peripheral device, a user interface for example, that is associated with the second computer system. Processor may processes data stored on non-volatile memory 108 according to the received event. Processor 104 is also configured to copy the data, for example over a secure channel, from the first computer system (e.g. main PC 140) to non-volatile memory 108 when storage device 100 is removably connected to the first computer system. In addition to this, processor 104 is also configured to synchronize data between the first computer system and non-volatile memory 104 of storage device 100, at a time when the storage device is connected to the first computer system. The synchronization process may also be applied over a secure channel.

The first computer system (main PC 140) includes or has associated with it, data 114 stored in one or more partitions. Illustration and description of other elements of main PC 140 is omitted for the sake of simplicity. Data 114 may include any combination of an operating system (OS) 110 and computer applications 112 (i.e., software), including computer sessions, computer settings, computer processes, graphical user interface ("GUI") related information, dialog box related information, menu information, one or more computer files, boot code, program code and other instruction codes that are required to boot main PC 140 and run computer applications 112 off main PC 140. Thus, it should be noted that data 114 refers not merely to programs and the like running on a computer system, but also to the applications, programs, settings, processes that may be used to emulate the computer system by a removable storage device.

The second computer system (secondary PC 150) includes, or has associated with it a computer peripheral device, such as a user interface, for generating an event that results from interaction of a user with this computer peripheral device. Second computer system further includes and/or is coupled with an additional computer peripheral device, such as a computer display or a network interface for example, such that processor 104 is further configured to interact with an interface application running on the second computer system by using the computer applications executed on storage device 100. The interface application enables connection of processor 104 to the computer peripheral (i.e. user interface) device and to the additional computer peripheral device (i.e. computer display and/or network interface). Processor 104 may be configured to, prior to execution of the interface application on the second computer system (e.g. secondary PC 150), upload the interface application onto the second computer system. Secondary PC 150 will be discussed in more detail later.

Being a mass storage device, NVM 108 has the capacity to store data 112a, including an operating system (OS) 110a and computer applications 112a, which processor 104 obtains from main PC 140 and replicates (copies) onto NVM 108 in order to emulate main PC 140. (Copying of operating system 110 is optional, as will be explained below.) Processor 104 interacts with the (copied) data 114a, and further executes OS 110a and computer applications 112a, via data and control signals bus 106.

Storage device 100 can be removably connected to one computer system, for example to main PC 140, or to a computer system that is not a main PC, for example to a secondary PC 150. By "main PC" is meant a PC that is emulated on a storage device. By "secondary PC" is meant a computer system whose computer peripheral devices are exploited by the storage device in order to allow the storage device to perform the PC emulation. At a given time, storage device 100 may be coupled either to main PC 140 (for copying data that are required to emulate the main PC), or to secondary PC 150 (to facilitate the emulation of main PC 140). Note that it is possible for main PC 140 to also be secondary PC 150, i.e., for storage device 100 to emulate a PC on itself. Note that it is further possible for storage device 100 to be connected to a main and secondary computer system that are not necessarily a personal computer.

Storage device 100 can identify a computer system to which it is connected (e.g., main PC 140 or secondary PC 150) by: (1) calculating unique parameters of a computer system, such as CPU Identification opcode (i.e., CPUID opcode used to determine processor type and presence of embedded features), hard drive serial number, network Media Access Control (MAC) address, or operating system characteristics; or (2) by use of a unique identifier that is written into a file or application on the main PC, for example when storage device 100 is mounted to main PC for the first time.

Connecting Storage Device 100 to Main PC 140—Copying the Emulation Particulars Assume that a user launches a Microsoft "WORD" on main PC 140 and performs operations with regard to this program (e.g., editing a document). Also assume that, at some point in time, the user wants to quit the editing process and to resume the editing later on or elsewhere.

In order to facilitate the quitting and resumption, the user connects storage device 100 to main PC 140. The connection of storage device 100 with main PC 140 invokes a synchronization application 116 on main PC 140. Basically, synchronization application 116 is a software application that performs a synchronization procedure of synchronizing between data in main PC 140 and data stored on a connectable device (e.g., storage device 100). Synchronization application 116, when invoked, interacts with the processing unit (e.g., processor 104) of the removable storage device. Upon connection of the storage device, synchronization application 116 temporarily pauses any active/open data (e.g., applications, etc.) running on main PC 140 and records the most recent working environment of main PC 140. Then, by communicating with the operating system (OS 110a) of the storage device, synchronization application 116 can read data from and write data to the file systems created thereon, for the purpose of synchronizing between the data in main PC and the data being stored on the connectable device (e.g., NVM 108).

Specifically, upon detecting a first connection between main PC 140 and storage device 100 synchronization application 116 is operable to copy all data 114 (optionally excluding OS 110) running on, and stored in main PC 140 from main PC 140 onto NVM 108. With respect to subsequent connections of storage device 100 to main PC 140, i.e., after an initial connection has been established, the synchronization process may be performed based on, and according to a variety of criterions that specify how the synchronization process operates, i.e., how a decision is made regarding what content to copy and when (see exemplary FIG. 4).

The synchronization process may occur automatically, e.g., to reflect data modifications occurring on a main PC, in response to user activation, or at scheduled intervals when a storage device is connected to main PC 140, for example. The synchronization process may also run on main PC 140 in the background, i.e., while main PC 140 is busy performing other tasks.

Synchronization application 116 utilizes synchronization algorithms, such as remote compression algorithms, "rsync" and the like, for carrying out the synchronization process. A client-server synchronization algorithm that allows the content of two remote files to be synchronized by communicating only the differences between them is the remote differential compression (RDC) algorithm. The RDC algorithm computes the differences between files on the fly, and is therefore suitable herein for efficient synchronization of files that are being updated independently (i.e., on main PC 140 and on storage device 100). The algorithm used is based on fingerprinting blocks on each file locally at both ends of the replication partners (replication pair). Since many types of file changes can cause the file contents to move (for example, a small insertion or deletion at the beginning of a file can cause the rest of the file to become misaligned to the original content) the blocks used for comparison are not based on static arbitrary cut points but on cut points defined by the contents of each file segment. This means that if a part of a file changes in length or blocks of the contents get moved to other parts of the file, the block boundaries for the parts that have not changed remain fixed related to the contents, and thus the series of fingerprints for those blocks don't change either, they just change position. By comparing all hashes in a file to the hashes for the same file at the other end of the replication pair, RDC is able to identify which blocks of the file have changed and which haven't, even if the contents of the file has been significantly reshuffled. Since comparing large files could imply making large numbers of signature comparisons, the algorithm is recursively applied to the hash sets to detect which blocks of hashes have changed or moved around, significantly reducing the amount of data that needs to be transmitted for comparing files.

The rsync utility is a software application for Unix systems for efficiently transmitting a structure (such as a file or a directory) across a communication link when the receiving computing system already has a different version of the same structure, for the purpose of making the copies on the two systems identical. When the sender's and recipient's versions of the file have many sections in common, the utility can transfer relatively little data to synchronize between the files. A utility called "rdiff" uses the rsync algorithm to generate delta files that include those parts of the file of the sender's version that do not match the recipient's version (i.e., the difference from the sender's file to the recipient's file), along with information on where to merge these blocks (delta files) into the recipient's version. The delta file are then sent to the recipient can then be applied to the recipient's file, making the copies identical.

Returning to FIG. 1, data 114a stored on NVM 108 is or contains a copy of data that resides in and/or is currently used by (i.e., currently running on) main PC 140. As noted, data 114a may include any combination of computer states, computer sessions, computer applications, computer settings, computer processes, one or more computer files, stored content, and also boot code, program code, and other instruction codes that are required to boot and run (copied) OS 100a on storage device 100 and to execute (copied) computer applications 112a on storage device 100. Data 114a may also contain a copy of one or more of a computer or resource state, or a setting that is related to or is associated with any other operation of OS 110a.

By copying the aforesaid data to storage device 100, storage device 100 can replace main PC 140 in executing the computer applications originally running on main PC 140. By "replacing main PC 140" is meant reconstructing the copied working environment of main PC 140 and allowing a user to resume work, which was interrupted in main PC 140, on storage device 100 as if the interruption did not occur.

Note that OS 110a may come pre-installed in storage device 100; thus copying of OS 110 is optional. It may be the case that OS 110a is pre-installed in storage device 100, for example during manufacturing. Hence, in such case there may be no need to copy OS 110. Nevertheless, data 114a containing a copy of one or more of a computer or resource state, or a setting that is related to or is associated with OS 100 may be used, for example, for adapting (e.g., upgrading) operation of (current) OS 110a according to operation of OS 110.

The data (data 114a) obtained from the first computer system, i.e. main PC 140, may be stored in (one or more) storage units, and computer applications and (optional) OS contained within this data may be executed on (one or more) processing units, that are architecturally identical or similar to the storage devices residing in the main PC 140. Alternatively, data 114a may be stored in, and computer applications and (optional) OS contained within this data may be executed on (one or more) processing units, that are not necessarily architecturally identical to the storage units storing data 114, but that are function-wise similar. For example, assume that main PC 140 contains an Intel Core Duo processor with 4 GB of Double Data Rate Random Access Memory (DDR RAM), a physical display adapter and a magnetic-media hard drive. Data 114a can be stored in, and computer applications and (optional) OS contained within this data may be executed on, substitute units, such as an Atom processor, 1 GB of DDR RAM and 3 GB of virtualized RAM, a virtual display adapter, and a flash-based hard drive.

The copy process in which data 114 are copied from main PC 140 to storage device 100 may be performed through a direct channel (e.g., connecting storage device 100 directly to main PC 140), or through an indirect channel (e.g., connecting storage device 100 to main PC 140 via a communication network). The connection link may be established using, for example, a secured channel. By a "secured channel" or "secure channel" is meant a communication link through which any part or the entire data, commands, and messages are transferred between two parties by using a security application (e.g., secure sockets layer ("SSL")), e.g., by applying 'end-to-end' encryption and mutual authentication between the two systems. The SSL is a commonly used security protocol that applies mutual authentication of two systems and establishes a connection through which encrypted data can be transferred in both directions (i.e., from main PC 140 to storage device 100 and vice versa) after the involved parties authenticate each other, for example by using authentication keys.

Main PC 140 may establish a secure channel with storage device 100, either through a direct channel or an indirect channel. Thus, by establishing a secure channel between storage device 100 and main PC 140, storage device 100 can receive from main PC 140 or send to main PC 140 data that may include copy protected data that are stored in, or running on main PC 140 and may not be transferable to and/or accessible by ineligible devices, such as secondary PC 150.

Storage devices are traditionally used to store files (e.g., user files, etc.). However, as disclosed herein, storage devices (e.g., storage device 100) can be provided with means that enable them to emulate PCs. In the context of this disclosure, a first operation mode of storage device 100 involves using the storage device in the above-mentioned traditional use, and multiple (e.g., second or third) operation modes of storage device 100 may involve, among other things, using the storage device to emulate a PC (discussed below). Stated differently, the data (i.e. data 114a) may be obtained from the first computer system in response to storage device 100 transitioning to a corresponding mode of operation, when the storage device is removably connected to the first computer system (main PC 140). The transitioning may be made pursuant to an action including one of input of a user to the storage device, via a hardware switch, a software implementation (e.g., a user selecting a menu item on the display of the storage device), and the like.

For example, in order to facilitate selection of an operation mode and transitioning between the operation modes, storage device 100 is provided with a manual (user-operable) mode selector 120 (or "mode selector" 120, for short). Mode selector 120, which may be a multi-state selector, enables a user to configure storage device 100 to operate in any one of the above-noted (and optionally other) operation modes, and storage device 100 interacts with main PC 140 according to the user selected operation mode. Mode selector 120 may be a dial feature, an electric switch, an optical sensor, a pressure sensor, a push button, DIP switch, etc. "DIP switch" is an electric switch that is packaged in a group in a standard dual in-line package ("DIP"). DIP switches are commonly used to customize the behavior of (i.e., to configure) an electronic device.

Mode selector 120 may have three distinct positions that allow a user to set storage device 100 to one of three operation modes as follows: (1) "storage" mode, (2) "copy emulation particulars" mode, and (3) "enforce emulation" mode.

The first operation mode (i.e., "storage" mode) may involve using the storage device in the above-mentioned traditional use. The second operation mode (i.e., "copy emulation particulars" mode) may involve copy emulation particulars on storage device 100 (i.e., initializing storage device 100 with an OS (optionally), computer applications, and other related data that are currently active on main PC 140). Data 114, including OS 110 and computer applications 112, which may be referred to as emulation particulars, may be copied to storage device 100 in response to the storage device 100 transitioning from a first operation mode (i.e., "storage" mode) to a second operation mode (i.e., "copy emulation particulars" mode), where the transition is made by a user setting mode selector 120 to a corresponding position.

The third operation mode (i.e., "enforce emulation" mode) may involve emulating main PC 140 on storage device 100 (i.e., using the copied emulation particulars with secondary PC 150). By "enforce emulation" typically means emulating the main computer system (e.g., main PC 140) on storage device 100; that is, bringing the emulation of main computer system into effect on storage device 100 (restoring the work environment, etc.). The third operation mode (i.e., "enforce emulation") is to be used after the second operation mode. Namely (i.e., when using storage device 100 with main PC 140), the user has to activate the second operation mode in order to copy to storage device 100 emulation particulars (e.g., OS 110 (optional), computer applications 112) that pertain to the PC to be emulated (in this example main PC 140). Then (i.e., when using storage device 100 with secondary PC 150), the user has to activate the third operation mode to perform the emulation by using the copied emulation particulars.

For example, when using storage device 100 with main PC 140 a user may set mode selector 120 to position "A" (see FIG. 1) in order to use storage device 100 as a regular mass storage device (e.g., "Disk-on-Key"), or to position "B" (see FIG. 1) in order to copy emulation particulars on storage device 100, or to position "C" in order to use the copied emulation particulars on storage device 100 with secondary PC 150. Mode selector 120 gives a user a simple way to select the operation mode of her/his storage device prior to connecting the storage device to a PC, such main PC 140. Alternatively, selecting a mode of operation for storage device 100 may be performed by an applet that runs on main PC 140.

Three-state mode selector 120 provides a full hardware-based solution to emulating a PC. Alternatively, a two-state mode selector 120, a four-mode selector 120, or any other multiple-state mode-selector 120 may be employed to provide a partial hardware-based solution to emulating a PC.

For example, if a two-state mode selector 120 is used, enabling the emulation requires also synchronization application 116, or a complementing software applet that is part of, or executable by synchronization application 116. Selection of the type of software applet and of the type of mode selector to be employed (i.e., which states are to be implemented by the mode selector) are interdependent. That is, if the two-state mode selector provides the "storage" and "copy emulation particulars" modes, then synchronization application 116, which is activated upon connection of storage device 100 to a host computer, has to be executed on the host computer (i.e., secondary PC 150) to enforce the emulation, and if the two-state mode selector provides the "storage" and "enforce emulation" modes, then synchronization application 116 has to be executed on the host computer (i.e., main PC 140) to activate the emulation particulars copy process. According to another example, a four-state mode selector 120 may be used to provide a fourth "synchronization" mode, for example, for invoking a synchronization process between storage device 100 and main PC 140, as further discussed below.

Emulation particulars (i.e., OS (optional), computer applications, and other related data) that pertain to one PC can be replaced with emulation particulars that pertain to another PC in order to likewise emulate the other PC by storage device 100.

Connecting Storage Device 100 to Secondary PC 150—Enforcing Emulation

After storage device 100 copies data 114 of main PC 140, for example to NVM 108, the user of storage device 100 can emulate main PC 140 on main PC 140 (e.g., restore the working environment, such as operational states, computer settings, etc. on main PC 140 from the point at which working on the main PC was interrupted), or on any other computer system, by exploiting the computer peripheral devices of the secondary PC for the emulation. For example, the other computer system can be secondary PC 150.

Secondary PC 150 may include, or be associated with it, a computer peripheral devices, such as a user interface 152 (e.g., keyboard, mouse), a computer display 154, and optionally a network interface 156. Illustration and description of other components of secondary PC 150 are omitted for the sake of simplicity. A user can use data 114*a* by connecting storage device 100 to secondary PC 150 and interacting with one of its peripheral devices.

When storage device 100 is connected to secondary PC 150, processor 104 uses data 114*a* to resume, or restore the interrupted working environment of main PC 140 by executing OS 110*a* and computer applications 112*a* directly off storage device 100. Resuming the interrupted working environment from storage device 100 may be achieved by OS 110*a* invoking a hibernation process. The hibernation process includes loading a (copied) memory image from NVM 108 into RAM 107, resetting the operational state of processor 104 and of all pertinent units (e.g., registers, I/O port flag, etc.) involved in the operation of processor 104 with values obtained from the loaded image in RAM 107, and resuming normal processor operations accordingly. Accessing and using data 114*a* does not include copying the data to secondary PC 150, meaning the data never touch the hard drive of the borrowed computer system and the storage device leaves no trace that it was ever there, because processor 104 will generally not allow them to be copied. Rather, data 114*a* are run on storage device 100, and secondary PC 150 is used to provide a user interface.

Thus, in addition to restoring the working environment of main PC 140, processor 104 takes control of computer peripherals devices 152, 154, and 156 to allow a user to interact with data 114*a*. Thus, data 114*a* can be used (e.g., displayed, modified, processed) by interaction of a user with appropriate ones of computer peripherals devices 152, 154, and 156. Interaction between processor 104 and computer peripherals devices 152, 154, and 156 is facilitated by an interface application 160 that runs on secondary PC 150. Processor 104 interacts with interface application 160 by using the copied computer applications 112*a*.

Interface application 160 may be software or an executable file system that, when running on secondary PC 150 (an exemplary system), enables bi-directional flow of data from an input peripheral device (e.g., keyboard 152) to processor 104, and output signals from processor 104 to an output peripheral device (e.g., computer display 154). Note that interface application 160 can reside in storage device 100 and be provided to (e.g., uploaded onto) secondary PC 150 from storage device 100 or any other system or device that is not storage device 100. Interface application 160 can be uploaded onto secondary PC by using an AutoRun feature, for example. "AutoRun" is an ability of a computer operating system to automatically take some action upon the insertion of a removable medium, such as a flash based storage device. Alternatively, interface application 160 can be pre-installed on secondary PC 150 and invoked by the operating system, for example, of secondary PC 150.

Interface application 160 transfers events, such as keyboard and mouse generated events, from the computer peripheral devices (e.g., user interface 152) to processor 104. Interface application 160 also transfers output signals (e.g., display signals) corresponding to a graphical or visual representation of data (e.g., graphical screen updates, graphical desktop application, or any graphical applications) in the other direction (i.e., from processor 104 to display 154).

An "event" may be an indicia of an interaction between a storage device and a system (e.g., PC) or device (e.g., computer peripheral device) that is operated by a user. An event may also be created automatically by one of the applications, programs, etc. running on, or attached to a system or device that is operated by the user. An event may also be generated from mouse drags, mouse gestures, mouse clicks, window-resizing, keyboard presses, messages from other programs, etc.

The interaction between the storage device and the system or device is made in the context of and thus associated with particular software (e.g., desktop application) or data that is accessible (e.g., displayed) to the user. For example, events may result from addition of text by a user with respect to a particular application (e.g., "WORD") that is currently running on storage device 100. Each time the user depresses a key of the keyboard, for example to add a particular character (e.g., "G") to a text, the keyboard generates an electric signal (i.e., interaction outcome). This electrical signal represents a symbol or character that, in the context of the application/software that is active at the time the key is depressed, corresponds to that key. Thus, an event is created. Thus the symbol or character is associated with (generated for) a particular application, program, document, etc. that is accessible to the user at the time he/she depresses the key.

Processor 104 receives the events resulting from the user interaction with any one of the computer peripheral devices of secondary PC 150, and responds to them accordingly. For example, if the user depressed a key on keyboard of user interface 152 to add the digit "8" to a currently open (i.e., active on computer display 154) document, processor 104 updates the document internally (i.e., in storage device 100), and sends a corresponding signal (command) to computer display 154 to reflect the change graphically.

After processor 104 receives events that are routed from user interface 152 to storage device 100 via interface application 160, processor 104 uses data 114 (e.g., computer applications 112a) to handle (i.e., interpret and respond to) the events. Processor 104 may handle the events by modifying or processing data 114a, creating a graphical representation of the modified data 114a, and then sending a command to secondary PC 150 to display the graphical representation on computer display 154. With respect to the example above, processor 104, in conjunction with interface application 160, creates a graphical representation of an updated Word document, so that a correct graphical representation of the updated Word document is displayed on computer display 154. The graphical representation may reflect the way data are displayed graphically on main PC 140.

Interface application 160 may be, or it may include or use, software such as Virtual Network Computing ("VNC"), or another redirection protocol. A redirection protocol redirects or reroutes events that originate from computer peripheral devices of a computer system (e.g., secondary PC 150) to a processor of another computer system (e.g., processor 104), and relays related or consequent control commands and graphical/visual representations of graphical applications in the opposite direction. For example, if a graphical application includes a dialogue box, then processor 104 returns e.g., a graphical representation of the dialogue box, or commands that carry parameters characterizing the dialogue box. Computer display 154 receives the graphical representation or the parameters characterizing the dialogue box and then displays an image of the dialogue box on secondary PC 150, or creates a new dialogue box for display on secondary PC 150 respectively.

"VNC" is a graphical desktop sharing system that provides remote access to graphical user interfaces ("GUIs"). The VNC system transmits or redirects graphical applications on secondary PC 150 to a VNC "Viewer" feature that is installed on secondary PC 150. The VNC system typically uses an RFB ("Remote FrameBuffer") redirection protocol that redirects a framebuffer (i.e., a memory image of the screen) to a connected device. "Framebuffer" is a video output device that drives a video display from a memory buffer that contains a complete frame of data. "Framebuffer" also denotes the actual memory that is used to store a picture frame.

Other redirection protocols, such as Microsoft Remote Desktop Protocol ("RDP"), can use a kernel driver on secondary PC 150 to construct the graphical applications and to use tools such as Windows Remote Desktop feature to redirect graphical applications to computer display 154.

Processor 104 may also use interface application 160 to connect to a network device 156. Network device 156 facilitates interaction between storage device 100 and secondary PC 150 via a communication network. This means that a user may use computer peripheral devices of a computer system (e.g., secondary PC 150) to work on documents that are stored in a remote storage device and/or networked storage area (other than storage device 100).

Re-Connecting Storage Device 100 to Main PC 140—Synchronizing

By copying data 114 from a computer system (e.g., main PC 140) to storage device 100, users can take with them, in addition to game/multimedia/document files as traditionally done, also a most recent 'map', or 'snapshot', of the working environment (i.e., setups, settings, attributes, etc.,) of the computer system. Upon reconnecting storage device 100 to a computer system, storage device 100 automatically uses the recent map of the computer system to reinstate the last state of applications and files, so that they are readily available to the user.

A user may want to re-connect storage device 100 to main PC 140 in order to synchronize (e.g. update) data 114 on main PC 140 with data 114a on storage device 100 when processor 104 was interacting with secondary PC 150. Thus, processor 104 is configured to synchronize data between the first computer system (e.g. main PC 140) and the non-volatile memory of the storage device 104, at a time when the storage device is connected to the first computer system. The data may be synchronized over a secure channel.

For example, as data 114a is initially identical to data 114 and changeable as a result of an interaction of the user with user interface 152, the user may also want to re-connect storage device 100 to main PC 140 in order to update data 114 with changes that the user made to data 114a at a time when the storage device was connected to secondary PC 150, for example. Likewise, the user may resume working on (i.e., changing) data 114 by interacting with the computer peripheral devices of main PC 140, and, therefore, s/he may want to re-connect storage device 100 to main PC 140 in order to update data 114a with changes that the user made to data 114. For example, a user may connect storage device 100 to main PC 140 and a data document that was created on main PC 140 is copied on storage device 100. The user may not use storage device 100, but rather continue working on the document from main PC 140. Then, when storage device 100 is re-connected to main PC 140, the (copied) document on storage device 100 needs to be updated with the latest document version stored in main PC 140. According to another example, a user may start working on main PC 140 and create a data document. Then, the user may copy the document to storage device 100 and continue working on the document by using the computer peripheral devices of secondary PC 150. Then, the user may want to resume working on the document on main PC 140. If the user creates two versions of the document—one on main PC 140 and another on storage device 100—s/he may want, at some point, to equalize (i.e., synchronize) the two versions. Therefore, while storage device 100 is re-connected to main PC 140, the two systems synchronize their data and computer applications.

Synchronization application 116, when interacting with storage device 100, compares the current state of data 114 running on and stored in main PC 140 with the current state of data 114a in NVM 108 and detecting discrepancies between them. Synchronization application 116 may access data 114 and data 114a, compare modification dates, checksums, file sizes, etc., with respect to every computer application, computer/application setting, file attribute, etc., or selected ones of them, and, based on a set of criterions, determines which data (e.g., settings, files, etc.) are to be updated and how. As mentioned above, the synchronization process may be carried out based on, and according to a variety of ways, see FIG. 4. For example, synchronization application 116 may be designed to use a more recent version of data on one system for updating the data on another system, to choose one reference system (such main PC 140), or to apply any combination thereof, among others.

With respect to the operation of mode selector 120, mode selector 120 may have an operational position (not shown in FIG. 1) corresponding to the synchronization between main PC 140 and storage device 100. That is, if the user selects this position, storage device 100 invokes synchronization application 116 on main PC 140.

Figure 2:
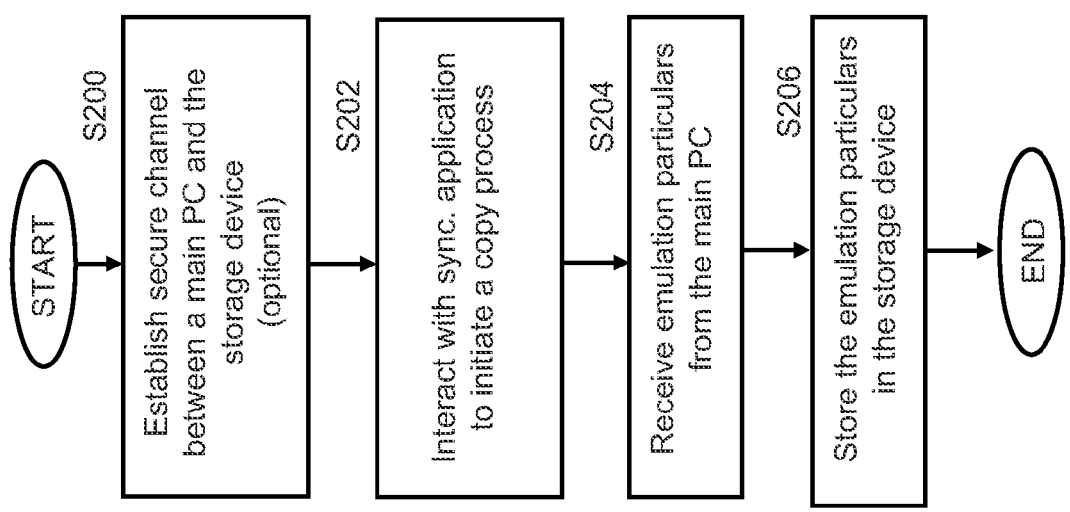
FIG. 2 illustrates a method for initializing a portable storage device in order for the storage device to emulate a computer system, according to an example embodiment.

FIG. 2 shows a method for initializing a storage device 100 for emulating a computer system according to an embodiment. FIG. 2 will be described in association with FIG. 1.

Assume that storage device 100 is connected to a main PC (e.g., main PC 140, an exemplary computer system). At step S200 (an optional step), storage device 100 invokes an executable security application (e.g., SSL) on main PC 140 to establish a secure channel between storage device 100 and main PC 140. As explained above, a secure channel enables main PC 140 to securely transfer data 114 to storage device 100.

After a secure channel is established between main PC 140 and storage device 100, processor 104 interacts, at step S202, with an application (e.g., synchronization application 116) residing on main PC 140 in order to initiate a copy process of emulation particulars (e.g., OS (optional), computer applications and other related data) from main PC 140 to storage device 100. Hence, connection of storage device 100 to main PC 140 and the establishment of the secure channel therebetween invokes synchronization application 116 to perform the copy process. The invoked application may perform the copy process by temporarily pausing data 114 currently running on main PC 140. While data 114 are paused, synchronization application 116 records the most recent working environment of main PC 140 and copies emulation particulars (i.e., data 114) from main PC 140 to storage device 100. As explained above, by emulation particulars is meant data 114 residing in or currently used by main PC 140, this including OS 110, computer applications 112, and also computer states, computer sessions, computer applications, computer settings, computer processes, one or more computer files, stored content, and also boot code, program code, and other information that pertains to the recorded working environment and that may be related to or associated with the usage of OS 110 and execution of computer applications 112.

Processor 104 receives, at step S204, data 114 (including OS 110 (optional) and computer applications 112) from main PC 140, and at step S206 stores the data in NVM 108 as data 114a (e.g., OS 110a, computer applications 112a, respectively). After the copy process is completed, storage device 100 is initialized with (includes) emulation particulars for emulating main PC 140. The emulation process is described in FIG. 3.

Figure 3:
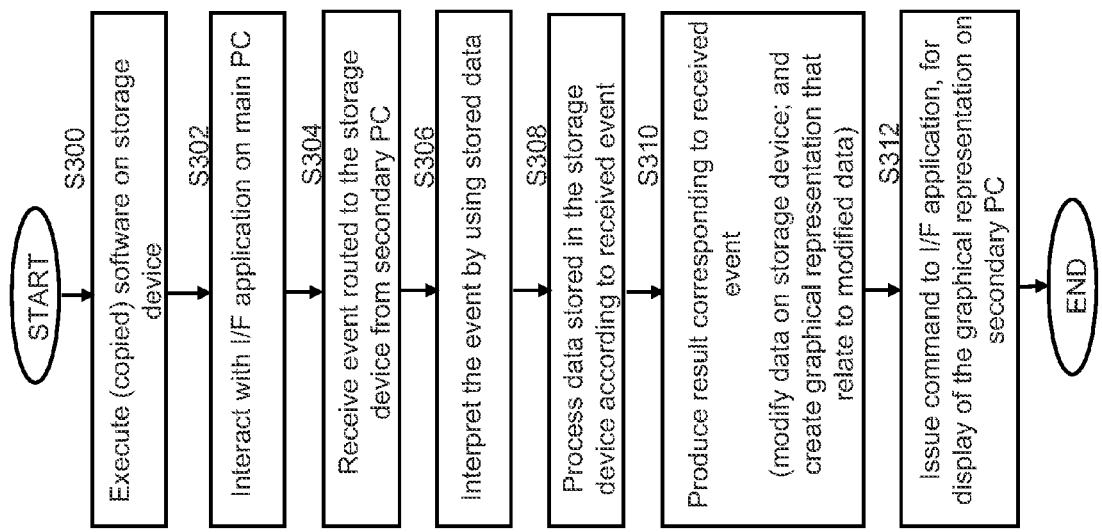
FIG. 3 illustrates a method for emulating a computer system on a portable storage device according to an example embodiment.

FIG. 3 illustrates a method for emulating a computer system on a storage device according to an embodiment. FIG. 3 will be described in association with FIG. 1 and FIG. 2.

Assume that storage device 100 has been initialized with emulation particulars, as per FIG. 2. Upon connecting storage device 100 to secondary PC 150 (an exemplary computer system), processor 104 executes, at step S300, computer applications 112a that are contained within the data (data 114a) that is copied to storage device 100 during the initialization phase. Processor 104 may execute computer applications 112a by using OS 110a. As explained above, OS110a may be copied to storage device 100 in the initialization phase, or be pre-installed in storage device 100 during manufacturing. Data 114a, which reflects the most recent working environment of main PC 140, allows processor 104 to restore that working environment later on e.g., on secondary PC 150. This means that if e.g., a document, or a computer game, etc. were at a certain stage of processing on main PC 140 when data 114 was copied to memory 108, then data 114a, being a copied version of data 114, enables processor 104 to continue the processing of the document, game, etc. from the same stage e.g., on secondary PC 150. Processor 104 may continue the processing of the document, game, etc. in conjunction with computer applications 112a using the computer peripheral devices of secondary PC 150.

At step S302, processor 104 invokes, and thereafter interacts with, interface application 160 through which processor 104 receives, at step S304, an event that is routed by interface application 160 from user interface 152.

After processor 104 receives the event from interface application 160, processor 104 interprets the received event, at step S306, by using the stored data, and at step S308 processes the data (data 114a) being stored on the storage device according to the received event. At step S310, processor 104 produces a result corresponding to (e.g. in response to and according to) the received event, which includes for example, modifying data stored in NVM 108 according to the received event; and creating a graphical, visual representation that relate to the modified data. Processor 104 may modify data by adding text to an open document and then storing the added text or updated text in NVM 108. (Note: at this stage the added text is invisible on computer display 154.)

At step S312, processor 104 issues a command to interface application 160 that is directed to computer display 154 of secondary PC 150. The command includes signals that represent a graphical representation of an image/data. In other words, by issuing the command processor 104 transmits signals that represent the graphical representation of the image/data to be displayed on computer display 154. In this way, processor 104 uses interface application 160 to display an image, for example of a document, on computer display 154. The image may include changes that the user makes, in real-time, in the document. (Note: the images themselves are not sent to secondary PC 150, but rather a graphical representation of the image, or commands, or signals that include parameters defining the image are sent).

Figure 4:
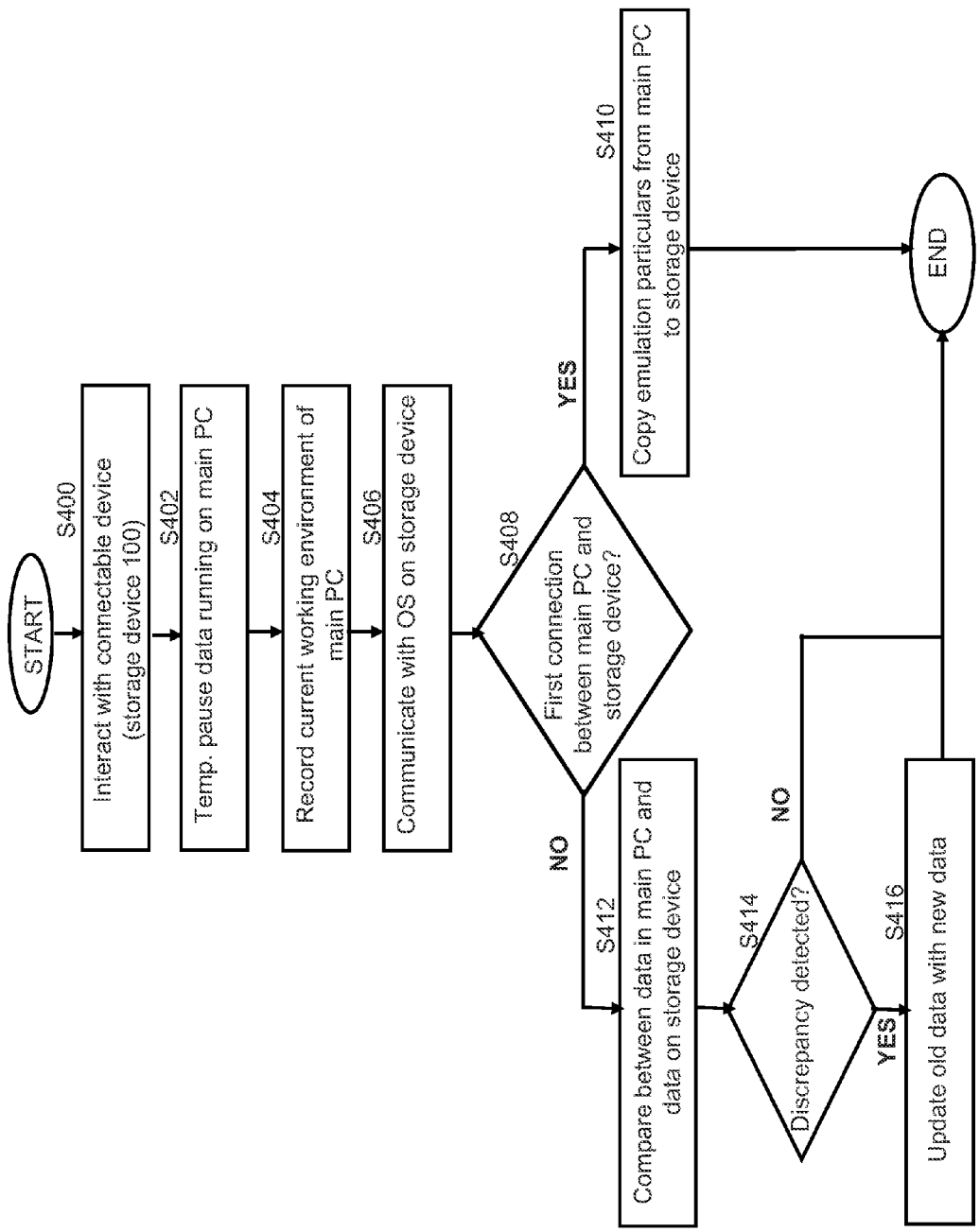
FIG. 4 shows a method for synchronizing data between main PC 140 and a connectable device, such as storage device 100 according to an example embodiment.

FIG. 4 shows a method for synchronizing data between main PC 140 and a connectable device, such as storage device 100, according to an embodiment. FIG. 4 will be described in association with FIG. 1.

Assume that storage device 100 is connected to main PC 140. The connection of the two systems (100, 140) invokes synchronization application 116 on main PC 140 to interact with storage device 100 (step S400), by communicating with the processing unit (e.g., processor 104) of storage device 100.

Upon connection, synchronization application 116 temporarily pauses (step S402) any active/open data (e.g., applications, etc.) running on main PC 140, and at step S404 records the most recent working environment of main PC 140. Then, by communicating with the operating system (OS 110a) of the connectable device (step S406), synchronization application 116 can read data from and write data to the file systems created thereon, for the purpose of synchronizing between the data in main PC and the data being stored on the connectable device (e.g., NVM 108).

At step S408, synchronization application 116 determines whether this is a first connection between main PC 140 and storage device 100. If this is a first connection between main PC 140 and storage device 100 (shown as "YES" at step S404), synchronization application 116 initiates a copy process for copying emulation particulars (i.e., data 114, including OS (optional), computer applications and stored content) from main PC 140 to storage device 100 (at step S410).

However, if this is not a first connection (shown as "NO" at step S410), then synchronization application 116 temporarily compares, at step S412, between the data (data 114) running and stored on main PC 140 and the data 114a being stored in storage device 100 (in NVM 108), and checks (at step S414) whether any discrepancy is detected between the data on the two systems (140, 100). If discrepancy between the data is not detected (shown as "NO" at step S414), this means that the data on storage device 100 is synchronized with data on main PC 140 and the method comes to an end. Steps S412 and S414 are performed in such a way so that data on the two systems are compared and updated for each computer application, metadata, stored content, etc. that reside (e.g., stored, running) on the two systems.

However, if discrepancy is detected (shown as "YES" at step S414) synchronization application 116 operates to synchronize the data on the two systems, by updating the "older data" with the "newer data" as follows: If discrepancy is detected in stored content (e.g., WORD document), then synchronization application 116 updates the data on the system (e.g., main PC 140) having, or associated with an earlier modification date (i.e., that has been copied, written or modified at an earlier point of date or time) according to the data on the other system (e.g., storage device 100) having a later modification date (i.e., that has been copied, written or modified at a later, more recent point of time). If discrepancy is detected in a computer application (e.g., WORD application), then synchronization application 116 updates the older version (e.g., WORD 2.0) stored on the system, say storage device 100, according to the newer, more advanced version (e.g., WORD 3.0) being stored on the other system, main PC 140.

The storage device of this disclosure may have a configuration that complies with any memory (e.g., flash memory), Trusted Flash device, Secure Digital ("SD"), mini SD, micro SD, Hard Drive ("HD"), Memory Stick ("MS"), USB device, Disk-on-Key ("DoK"), and the like, and with memory card format, such as a secured digital (SD) memory card format used for storing digital media such as audio, video, or picture files. The device may also have a configuration that complies with a multi media card (MMC) memory card format, a compact flash (CF) memory card format, a flash PC (e.g., ATA Flash) memory card format, a smart-media memory card format, a USB flash drive, or with any other industry standard specifications. One supplier of these memory cards is SanDisk Corporation, assignee of this application.

The storage device may also have a configuration complying with a high capacity subscriber identity module (SIM) (HCS) memory card format. The high capacity SIM (HCS) memory card format is a secure, cost-effective and high-capacity storage solution for the increased requirements of multimedia handset, typically configured to use a host's network capabilities and/or other resources, to thereby enable network communication.

The storage device is a nonvolatile memory that retains its memory or stored state even after power is removed. The storage device may also be based on erasable programmable memory technologies, including but not-limited to electrically-erasable and programmable read-only memories (EEPROMs), EPROM, MRAM, FRAM ferroelectric and magnetic memories. Note that the device configuration does not depend on the type of removable memory, and may be implemented with any type of memory, whether it is a flash memory or another type of memory.

Host systems (also referred to herein as computer systems, host devices, and PCs) with which such storage devices are used, include not only personal computers (PCs) but also cellular telephones, notebook computers, hand held computing devices, cameras, audio reproducing devices, and other electronic devices requiring removable data storage. Flash EEPROM systems are also utilized as bulk mass storage embedded in host systems. The storage device may be connected to or plugged into a compatible socket of a PDA (Personal Digital Assistant), mobile handset, and other various electronic devices. A PDA is typically known as a user-held computer system implemented with various personal information management applications, such as an address book, a daily organizer, and electronic notepads, to name a few.

What is claimed is:

1. A method for emulating a computer system on a removable storage device, comprising:
in a storage device having a non-volatile memory and a processor, the non-volatile memory storing data obtained from a first computer system, the data containing computer applications, performing by the processor, when the storage device is removably connected to a second computer system, the second computer system being associated with a computer peripheral device:
executing the computer applications within the storage device;
receiving an event from the second computer system, wherein the event results from user interaction of a user with the computer peripheral device, the user interaction being associated with the computer applications executed on the storage device;
interpreting the event by using the data stored on the storage device;
producing a result corresponding to the received event; and
interacting with an interface application running on the second computer system by using the computer applications executed within the storage device, wherein the interface application enables connection of the processor to the computer peripheral device.

2. The method of claim 1, further performing by the processor:
copying the data from the first computer system to the non-volatile memory when the storage device is removably connected to the first computer system.

3. The method of claim 2, wherein the data is copied over a secure channel.

4. The method of claim 1, wherein the interpreting includes processing, according to the received event, data stored on the non-volatile memory.

5. The method of claim 1, wherein the data further includes one or more of computer states, computer settings, computer sessions, computer processes, one or more computer files, stored content, boot code, program code, and other instruction code obtained from the first computer system.

6. The method of claim 1, wherein the data contains an operating system obtained from the first computer system, including one or more of a state, a resource, and a setting of the operating system of the first computer system.

7. The method of claim 1, wherein the data is obtained from the first computer system in response to the storage device transitioning to a corresponding mode of operation, when the storage device is removably connected to the first computer system.

8. The method of claim 7, wherein the transitioning is made pursuant to an action including one of user input to the storage device, via a hardware switch or a software application.

9. The method of claim 1, wherein the interface application enables connection of the processor to an additional computer peripheral device when the second computer system includes or is coupled to the additional computer peripheral device.

10. The method of claim 9, further performing by the processor, prior to execution of the interface application on the second computer system:
uploading of the interface application onto the second computer system.

11. The method of claim 1, further performing by the processor:
synchronizing data between the first computer system and the non-volatile memory of the storage device, at a time when the storage device is connected to the first computer system.

12. The method of claim 11, wherein the data are synchronized over a secure channel.

13. A storage device, comprising:
a non-volatile memory to store data obtained from a first computer system, the data containing computer applications; and
a processor configured to, when the storage device is removably connected to a second computer system, the second computer system being associated with a computer peripheral device:
execute the computer applications within the storage device;
receive an event from the second computer system, wherein the event results from user interaction of a user with the computer peripheral device, the user interaction being associated with the computer applications executed in the storage device;
interpret the event by using the data stored on the storage device;
produce a result corresponding to the received event; and
interact with an interface application running on the second computer system by using the computer applications executed within the storage device, wherein the interface application enables connection of the processor to the computer peripheral device.

14. The storage device of claim 13, wherein the processor is further configured to:
copy the data from the first computer system to the non-volatile memory when the storage device is removably connected to the first computer system.

15. The storage device of claim 14, wherein the processor copies the data over a secure channel.

16. The storage device of claim 13, wherein the processor processes, according to the received event, data stored on the non-volatile memory.

17. The storage device of claim 13, wherein the data further includes one or more of computer states, computer settings, computer sessions, computer processes, one or more computer files, stored content, boot code, program code, and other instruction code obtained from the first computer system.

18. The storage device of claim 13, wherein the data contains an operating system obtained from the first computer system, including one or more of a state, a resource, and a setting of the operating system of the first computer system.

19. The storage device of claim 13, wherein the data is obtained from the first computer system in response to the storage device transitioning to a corresponding mode of operation, when the storage device is removably connected to the first computer system.

20. The storage device of claim 19, wherein the transitioning is made pursuant to an action including one of user input to the storage device, via a hardware switch or a software application.

21. The storage device of claim 13, wherein the interface application further enables connection of the processor to an additional computer peripheral device when the second computer system includes or is coupled to the additional computer peripheral device.

22. The storage device of claim 21, wherein the processor further is configured to, prior to execution of the interface application on the second computer system:
upload the interface application onto the second computer system.

23. The storage device of claim 13, wherein the processor is further configured to:
synchronize data between the first computer system and the non-volatile memory of the storage device, at a time when the storage device is connected to the first computer system.

24. The storage device of claim 23, wherein the processor synchronizes the data over a secure channel.

25. The storage device of claim 13, wherein at least one of the first computer system or the second computer system is a personal computer (PC).

\* \* \* \* \*